(12) United States Patent
Keane

(10) Patent No.: US 9,979,701 B2
(45) Date of Patent: May 22, 2018

(54) CONTENT MANAGEMENT SYSTEM

(71) Applicant: BigTinCan Holdings Limited, Sydney (AU)

(72) Inventor: David Malcolm Keane, Killara (AU)

(73) Assignee: BigTinCan Holdings Limited, Sydney, New South Wales (AU)

( * ) Notice: Subject to any disclaimer, the term of this patent is extended or adjusted under 35 U.S.C. 154(b) by 0 days. days.

(21) Appl. No.: 14/436,805

(22) PCT Filed: Nov. 1, 2012

(86) PCT No.: PCT/AU2012/001342
§ 371 (c)(1),
(2) Date: Apr. 17, 2015

(87) PCT Pub. No.: WO2014/066924
PCT Pub. Date: May 8, 2014

(65) Prior Publication Data
US 2015/0326538 A1    Nov. 12, 2015

(51) Int. Cl.
*H04L 29/06* (2006.01)
*G06F 17/30* (2006.01)
*G06F 21/10* (2013.01)

(52) U.S. Cl.
CPC .... *H04L 63/0428* (2013.01); *G06F 17/30864* (2013.01); *G06F 21/10* (2013.01)

(58) Field of Classification Search
CPC . H04L 63/0428; G06F 17/30864; G06F 21/10
See application file for complete search history.

(56) References Cited

U.S. PATENT DOCUMENTS 8,393,007 B2 * 3/2013 Stefik ................ G06F 21/10
726/29
9,497,062 B1 * 11/2016 Carpentier .......... G06F 17/3061
(Continued)

FOREIGN PATENT DOCUMENTS

WO    2014066924    5/2014

OTHER PUBLICATIONS

Han et al., EMCEM: An Efficient Multimedia Content Encryption Scheme for Mobile Handheld Devices, Jan. 2008, International Conference on Information Science and Security, pp. 108-114 (Year: 2008).*

(Continued)

*Primary Examiner* — Kenneth W Chang
(74) *Attorney, Agent, or Firm* — Kilpatrick Townsend and Stockton, LLP

(57) ABSTRACT

Disclosed is a content management system comprising: a server; a content database, configured within the server, within which are stored one or more channels, each channel comprising one or more stories, each story comprising a title and one or more files; and one or more user devices connected to the network, each user device being associated with a user, each user device being configured to allow the associated user to view one or more stories from a channel to which the associated user has viewing rights. The title of each story and the names of the files contained in the story are stored obfuscated in the content database, and the files are stored encrypted in the content database.

22 Claims, 12 Drawing Sheets

(56) References Cited

U.S. PATENT DOCUMENTS

| | | | | |
|---|---|---|---|---|
| 2001/0039659 | A1* | 11/2001 | Simmons | H04N 7/17336 725/61 |
| 2002/0077985 | A1* | 6/2002 | Kobata | G06F 21/10 705/51 |
| 2003/0070071 | A1* | 4/2003 | Riedel | G06F 21/6218 713/165 |
| 2004/0091114 | A1* | 5/2004 | Carter | G06F 21/606 380/259 |
| 2006/0048232 | A1* | 3/2006 | Jung | H04L 63/0428 726/27 |
| 2006/0122936 | A1* | 6/2006 | Balfanz | G06F 21/10 705/51 |
| 2006/0200865 | A1* | 9/2006 | Leake, Jr. | G06F 21/10 726/27 |
| 2007/0043667 | A1* | 2/2007 | Qawami | G06F 21/10 705/50 |
| 2007/0258113 | A1* | 11/2007 | Vau | H04N 1/3871 358/452 |
| 2008/0181575 | A1* | 7/2008 | Girard | H04N 7/17318 386/244 |
| 2008/0184317 | A1* | 7/2008 | Khedouri | G06F 17/30094 725/86 |
| 2009/0094165 | A1* | 4/2009 | Royo | G06Q 10/087 705/80 |
| 2009/0141891 | A1* | 6/2009 | Boyen | G06F 21/602 380/44 |
| 2010/0115288 | A1* | 5/2010 | Monk | G06F 21/602 713/189 |
| 2010/0251371 | A1* | 9/2010 | Brown | G06F 21/554 726/23 |
| 2011/0066843 | A1* | 3/2011 | Newman | A63F 13/358 3/358 |
| 2012/0216299 | A1 | 8/2012 | Frank | |

OTHER PUBLICATIONS

BigTinCan Dashboard Product Overview, Jun. 2011, 5 pages.
International Search Report dated Jan. 16, 2013 in PCT/AU2012/001342, 3 pages.
Benefits of Using Btc Dashboard, BTC Dashboard, Dec. 2011, 2 pages.
Security White Paper, Bigtincan Dashboard, Nov. 2011, pp. 1-6.
The Intranet for the Mobile Generation, BTC Dashboard, Dec. 2011, 2 pages.
The Intranet for the Mobile Generation, Dashboard White Paper Small, Jul. 2011, pp. 1-9.
International Application No. PCT/AU2012/001342, International Preliminary Report on Patentability dated May 14, 2015, 6 pages.

* cited by examiner

CONTENT MANAGEMENT SYSTEM

CROSS-REFERENCE TO RELATED APPLICATIONS

This application is a U.S. National Phase of International Application No. PCT/AU2012/001342, filed Nov. 1, 2012, the disclosure of which is hereby incorporated by reference in its entirety.

FIELD

The present invention relates generally to the use and exchange of electronic content and, in particular, a system for managing and delivering electronic content.

BACKGROUND

The use and exchange of electronic content (e.g., text, audio, images, audiovisual or multimedia material, executables) between users is one of the key functions of any business. Conventional methods of using and exchanging content have been error-prone, insecure and inefficient. Electronic content often is lost and wrong versions of the content exchanged.

Sharing the right content with the right person at the right time is challenging enough for businesses to manage on fixed personal computers. However, with the advent of mobile devices, new issues surrounding the sharing of content are arising. One of these issues is security of content such as electronic documents comprising confidential business information.

Conventional intranet applications do not provide productivity growth required for corporations that need to deliver secure information to mobile users. Such intranet applications are not able to deliver content including rich media file structured information, or embrace Internet and social media sourced content in a way that encourages users to engage with the content to improve work effectiveness. Conventional intranet applications do not work efficiently on current and future generation mobile devices like mobile telephones, tablets and the like.

A need therefore exists for a more efficient and secure method of delivering electronic content to one or more users.

SUMMARY

It is an object of the present invention to overcome, or at least ameliorate, one or more disadvantages of existing arrangements.

In accordance with one aspect of the present invention, there is disclosed a content management system comprising: a server; a content database, configured within the server, within which are stored one or more channels, each channel comprising one or more stories, each story comprising a title and one or more files; and one or more user devices connected to the network, each user device being associated with a user, each user device being configured to allow the associated user to view one or more stories from a channel to which the associated user has viewing rights. The title of each story and the names of the files contained in the story are stored obfuscated in the content database, and the files are stored encrypted in the content database.

In accordance with a second aspect of the present invention, there is disclosed a method of managing content, the method comprising: uploading, by a first user device, a story comprising a title and one or more files, to a content database configured within a server; requesting, by a second user device, an update to the content stored in the content database; authenticating, by the server, the second user device; making available for download, by the authenticated second user device, the uploaded story; and downloading, by the authenticated second user device, the uploaded story. The title of the story and the names of the files contained in the story are stored obfuscated in the content database, and the files are stored encrypted in the content database.

Other aspects of the invention are also disclosed.

BRIEF DESCRIPTION OF THE DRAWINGS

One or more embodiments of the present invention will now be described with reference to the drawings and appendices, in which.

DETAILED DESCRIPTION

Figure 1A:
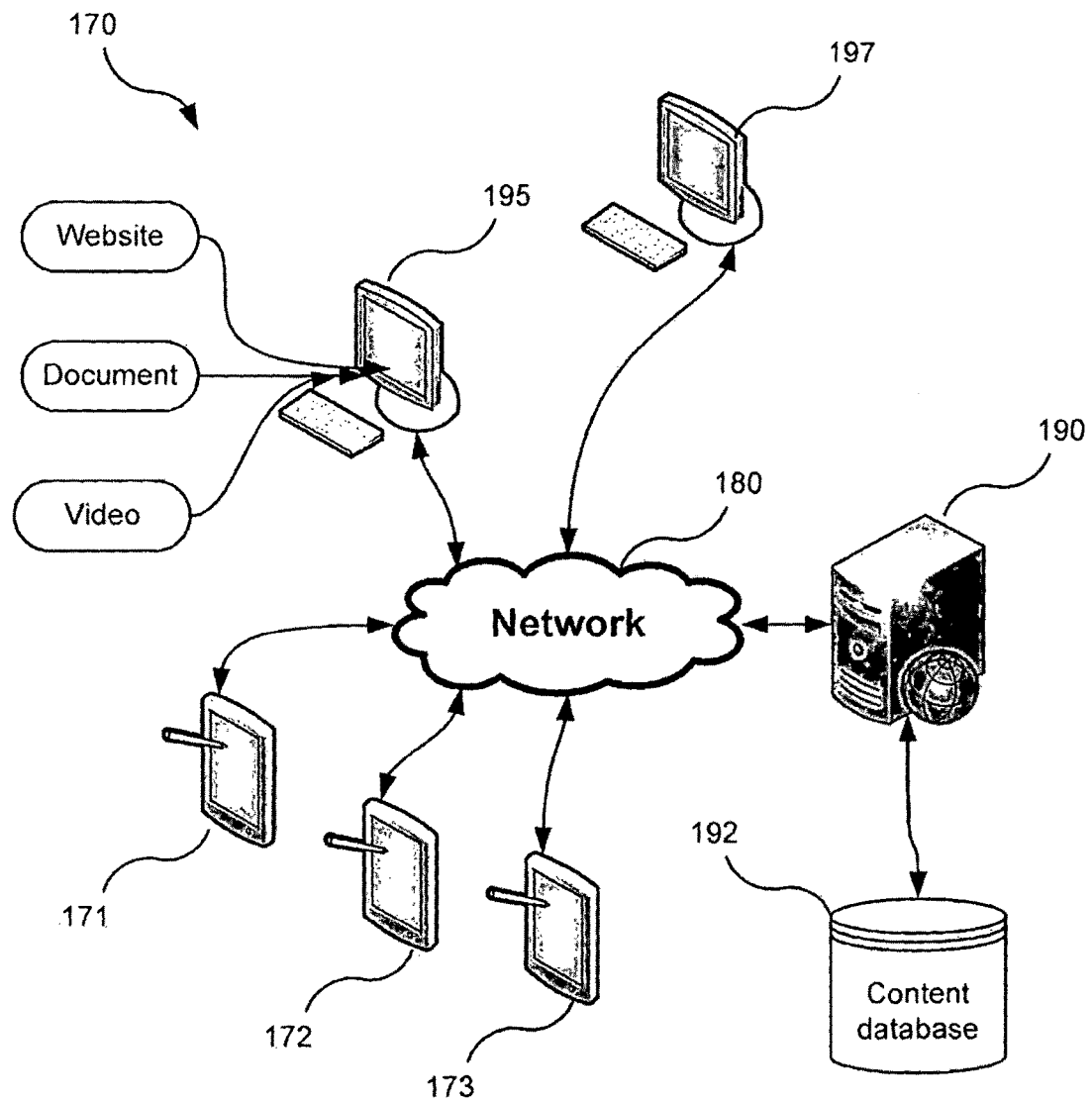
FIG. 1A is a block diagram of a content management system according to one embodiment.

Where reference is made in any one or more of the accompanying drawings to steps and/or features, which have the same reference numerals, those steps and/or features have for the purposes of this description the same function(s) or operation(s), unless the contrary intention appears.

FIG. 1A is a block diagram of a content management system 170 according to one embodiment of the invention. A user (not shown), operating a user device, either a user computer 195 or a mobile computing device or "tablet" 171, 172, or 173, compiles different types of files, for example websites, documents, or content, such as video, into a "story", which is then sent to a content management server 190. The stories are received by, and stored within, the server 190. The server 190 "pushes" the stories to any user, via an associated user device, who may have access to those stories. Finally, the stories are downloaded and/or viewed on the user device, ready to be edited. Once a story has been created, any other user who has access to that story may add content to the story, or edit the content contained therein; using their associated user device. Users may also annotate image or PDF files in stories. These changes to the story are then sent to the server 190, stored within the server 190, pushed back to other users, and downloaded by users. An administrator (not shown) operating an administrator computer 197 is responsible for administering the system 170, including creating users, and creating groups and channels. Information regarding the usage of the stored content by users is also stored on the server 190 and used to preferentially present content to users based on potential relevance or importance to those users.

Detailed descriptions of the various processes mentioned above appear below.

The server 190 is connected to a communications network 180. The communications network 180 may be a wide-area network (WAN), such as the Internet, a cellular telecommunications network, or a private WAN. The user computer 195, administrator computer 197, and, in some implementations, a "push" server (not shown), and an applications server (not shown) are also connected to the network 180, over which they may communicate with the server 190.

The system 170 uses a content store architecture, whereby content may be added dynamically to, and referenced from, a content database 192 configured within the server 190. The user computer 195 may be used to interrogate the content database 192 before being referenced to content files stored on the server 190. The user computer 195 may be configured with a secure application programming interface (API). The content files may then be retrieved and transmitted to the user computer 195 by the server 190 before being displayed on the user computer 195. The content files are encrypted by the server 190 before being transmitted to the user computer 195 using secure sockets layer (SSL) transmission.

Similarly, the one or more tablets 171, 172, and 173, are connected to the server 190 via the network 180. Each of the tablets 171, 172, and 173 may also be used to interrogate the content database 192 before being referenced to content files stored on the server 190. As with the user computer 195, the content files may then be retrieved and transmitted to one or more of the tablets 171, 172 and 173 by the server 190 before being displayed on the tablets 171, 172 or 173. The tablets 171, 172 and 173 may each be configured with a secure API.

In implementations of the system 170 in which the push server is present, the content database 192 is configured within the push server to store and deliver content to the user devices as described in detail below. The calculations described below relating to the usage and the relevance of content are also carried out in the push server. In implementations of the system 170 in which the application server is present, the application server performs conversion tasks for specific pieces of content that need to be converted before storage or delivery to user devices, such as image format conversion. However, the remainder of this disclosure is directed to implementations in which the push server and the application server are not present, so the server 190 handles these functions.

Figure 1B:
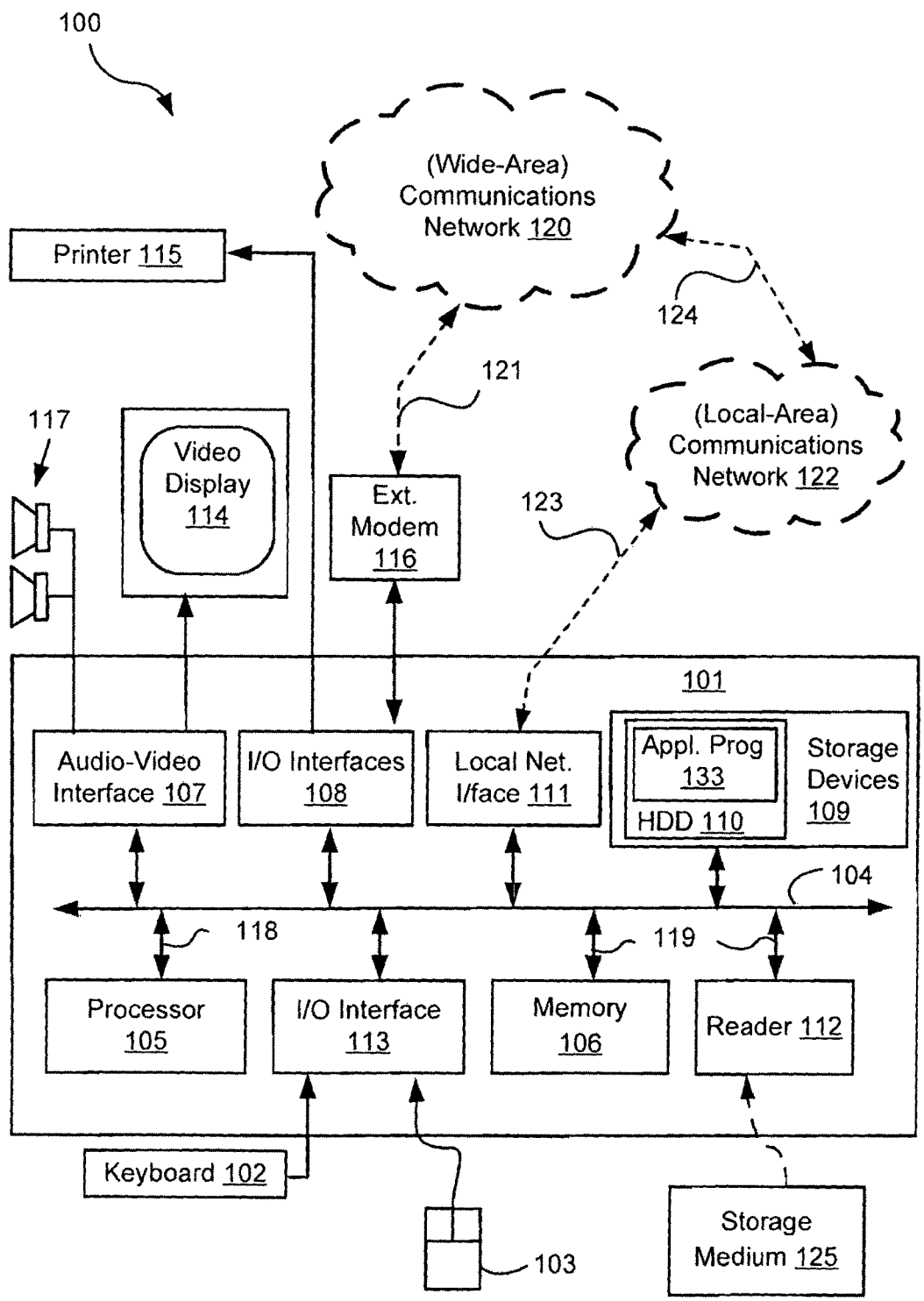
FIGS. 1B and 1C form a schematic block diagram of a computer system upon which one or more of the server, user mobile computing devices, user computer, and administrator computer in the system of FIG. 1 can be implemented.
Figure 1C:
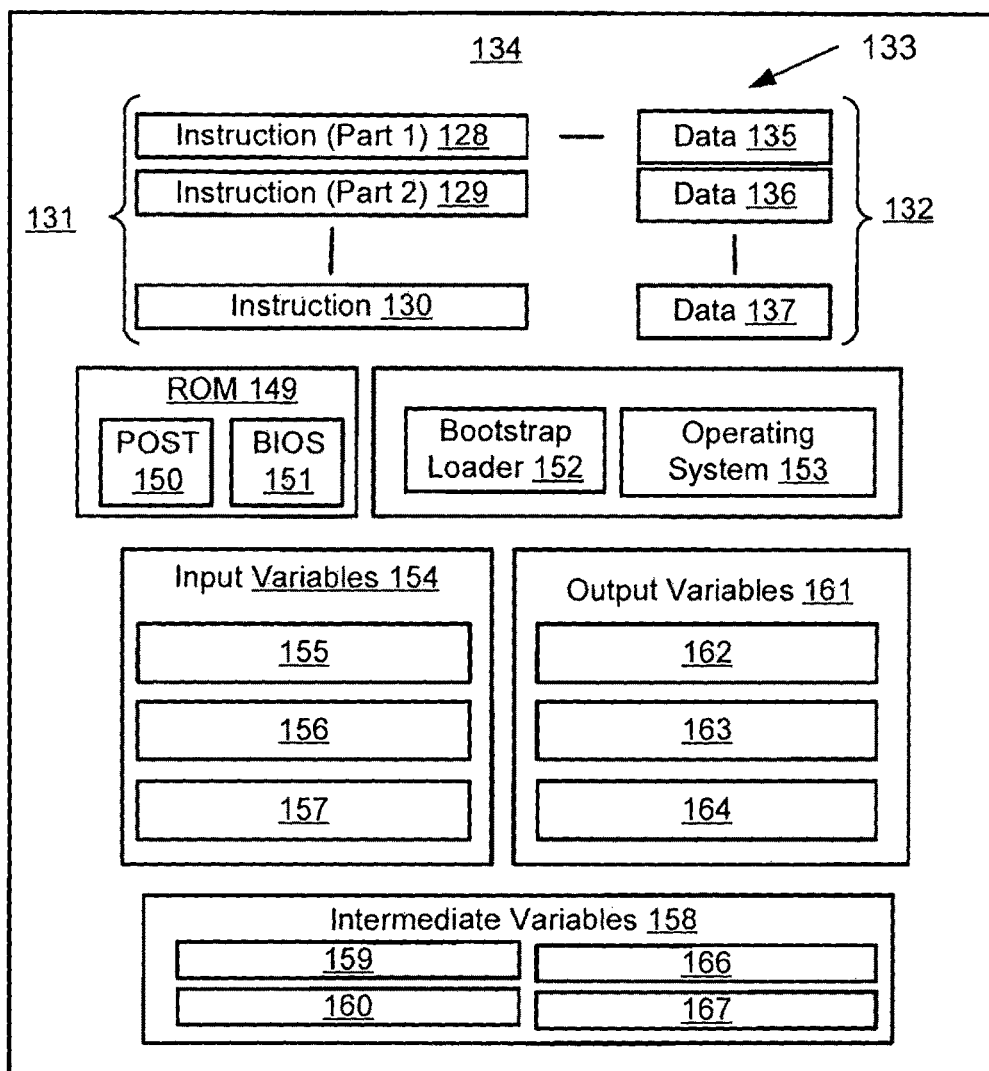
Figure 1C:
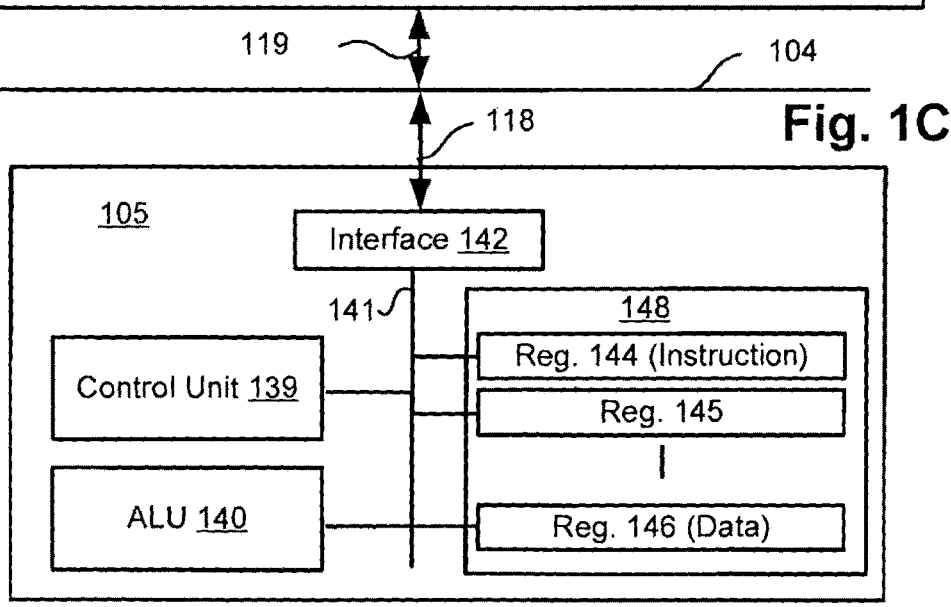

FIGS. 1B and 1C collectively form a block diagram of a computer system 100 upon which one or more of the server 190, tablets 171 to 173, user computer 195, and administrator computer 197 in the system 170 of FIG. 1 may be implemented.

As illustrated in FIG. 1B, the computer system 100 includes: a computer module 101; input devices such as a keyboard 102 and a mouse pointer device 103; and output devices including a printer 115, a display device 114 and loudspeakers 117. An external Modulator-Demodulator (Modem) transceiver device 116 may be used by the computer module 101 for communicating to and from the communications network 120 via the connection 121. The network 120 may be identified with the network 180 in FIG. 1A.

Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120. The connection 121 preferably operates at a speed greater than 14 kbps.

The computer module 101 typically includes at least one processor unit 105, and a memory unit 106. For example, the memory unit 106 may have semiconductor random access memory (RAM) and semiconductor read only memory (ROM). The content database 192 may be configured within memory 106 and/or hard disk drive 110 of computer module 101 when implementing the server 190.

The computer module 101 also includes an number of input/output (I/O) interfaces including: an audio-video interface 107 that couples to the video display 114 and loudspeakers 117; an I/O interface 113 that couples to the keyboard 102 and mouse 103, and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1B, the local communications network 122 may also couple to the wide network 120 via a connection 124, which would typically include a so-called "firewall" device or device of similar functionality. The local network interface 111 may comprise an Ethernet™ circuit card, a Bluetooth™ wireless arrangement or an IEEE 802.11x wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the computer system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practiced include IBM-PC's and derived machines, Apple iMac™ or like computer systems.

The methods to be described below with reference to FIGS. 2 to 7 may be implemented as one or more software applications 133 executable within the computer system 100. In particular, one or more steps of the described methods may be effected by instructions 131 (see FIG. 1C) in the software 133 that are carried out within the computer system 100. The software instructions 131 may be formed as one or more code modules, each for performing one or more particular tasks. The software 133 may also be notionally divided into two separate parts, in which the code modules making up the first part perform the described methods and the code modules making up the second part manage a user interface between the first part and the user.

The software 133 resident on and being controlled in its execution by the computer system 100 when implementing any of the user computer 195 and the tablets 171, 172 and 173 is referred to as a "client application", while the software 133 resident on and being controlled in its execution by the computer system 100 when implementing the server 190 is referred to as a "server application", and the software 133 resident on and being controlled in its execution by the computer system 100 when implementing the administrator computer 197 is referred to as an "administrator application".

The software 133 may be stored in a computer readable medium, including the storage devices described below, for example. The software 133 is loaded into the computer system 100 from the computer readable medium, and then executed by the computer system 100. Thus, for example, the software 133 may be stored on an optically readable disk storage medium (e.g., CD-ROM) 125 that is read by the optical disk drive 112. The software 133 is typically stored in the HDD 110 or the memory 106 of the computer module 101. A computer readable medium having such software or computer program recorded on the computer readable medium is a computer program product. The use of the computer program product in the computer system 100 effects an advantageous apparatus for implementing the described methods.

In some instances, the software 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external to the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse, 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117.

FIG. 1C is a detailed schematic block diagram of the processor 105 and a "memory" 134. The memory 134 represents a logical aggregation of all the memory modules (including the HDD 109 and semiconductor memory 106) that can be accessed by computer system 100 in FIG. 1B.

When the computer system 100 is initially powered up, a power-on self-test (POST) program 150 executes. The POST program 150 is typically stored in a ROM 149 of the semiconductor memory 106 of FIG. 1B. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1B. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface. Examples of operating systems include iOS™ from Apple of Cupertino, Calif., and VMware™ V5 from VMware, Inc., of Palo Alto, Calif.

The operating system 153 manages the memory 134 (109, 106) to ensure that each process or application running on the computer module 101 has sufficient memory in which to execute without colliding with memory allocated to another process. Furthermore, the different types of memory available in the computer system 100 of FIG. 1B must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1C, the processor 105 includes a number of functional modules including a control unit 139, an arithmetic logic unit (ALU) 140, and a local or internal memory 148, sometimes called a cache memory. The cache memory 148 typically include a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The software 133 includes a sequence of instructions 131 that may include conditional branch and loop instructions.

The software 133 may also include data 132 which is used in execution of the software 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 1105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1B. The execution of a set of the instructions may in some cases result in output of data. Execution may also involve storing data or variables to the memory 134.

The disclosed arrangements use input variables 154, which are stored in the memory 134 in corresponding memory locations 155, 156, 157. The disclosed arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1C, the registers 144, 145, 146, the arithmetic logic unit (ALU) 140, and the control unit 139 work together to perform sequences of micro-operations needed to perform "fetch, decode, and execute" cycles for every instruction in the instruction set making up the software 133. Each fetch, decode, and execute cycle comprises:
(a) a fetch operation, which fetches or reads an instruction 131 from a memory location 128, 129, 130;
(b) a decode operation in which the control unit 139 determines which instruction has been fetched; and
(c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 2 to 7 is associated with one or more segments of the software 133 and is performed by the register section 144, 145, 147, the ALU 140, and the control unit 139 in the processor 105 working together to perform the fetch, decode, and execute cycles for every instruction in the instruction set for the noted segments of the software 133.

The described methods may alternatively be implemented in dedicated hardware such as one or more integrated circuits performing the functions or sub functions of described processes. Such dedicated hardware may include graphic processors, digital signal processors, or one or more microprocessors and associated memories.

Figure 2A:
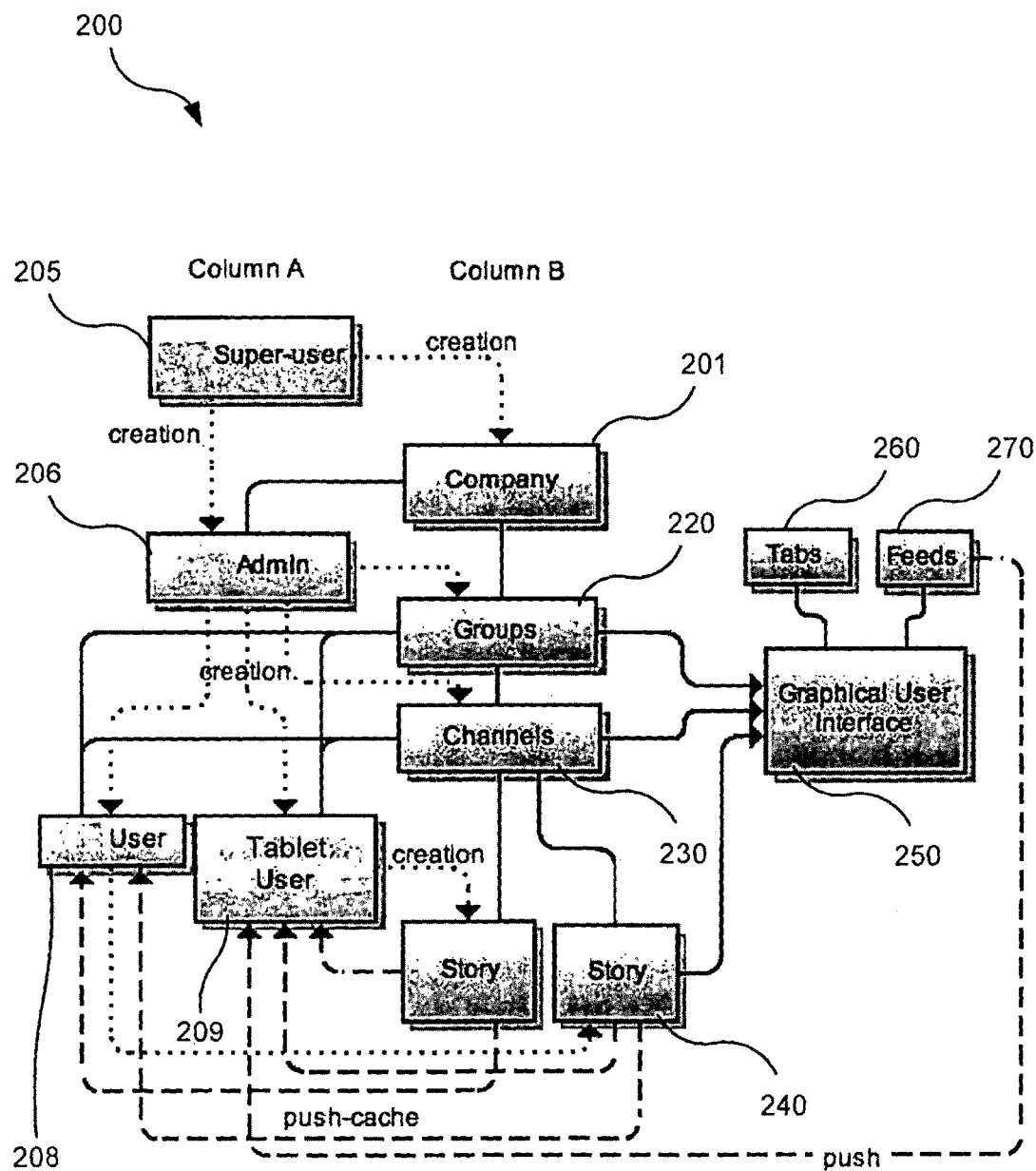
FIG. 2A is an illustration of the hierarchy of access levels to control the implementation of the server application.

The following describes how the system 170 may be used in a business context. FIG. 2A is an illustration 200 of the hierarchy, of access levels that controls the implementation of the system 170 (column A) in relation to the creation of a hierarchy of categories or grouping within the server application (column B). This access control and grouping are then used to determine which information and content may be delivered to and displayed on the graphical user interface 250 of the client application running on the user computer 195 or tablets 171 to 173. Once the server application has been implemented and deployed on the server 190, a person (referred to as the 'super-user') 205 with the highest access level to manipulate the implementation of the server application on the server 190 may then, e.g. via a web interface, create a 'company' account that is associated with the organization 201 that desires to use the server application. The company account is linked with a contact person from that organization. The super-user 205 may then add software modules (known as widgets) as appropriate to the needs of the organization 201, such as 'annotation' or 'sharing'. The super-user 205 also adds an 'admin' account, which is linked to a person (the 'admin') 206 delegated by the organization 201 to have a high access level to manage the organization's implementation of the server application by operating the administrator application on the administrator computer 197.

The admin 206 operating the administrator application on the administrator computer 197 has the ability to add and change "groups" 220 of users (which may be used to differentiate, for example, different departments of the organization, such as sales or human resources); "channels" 230 (which are associated with one or more users and/or groups, and may be used to differentiate different themes of content, such as projects, meetings or job functions); "stories" 240, 241 (content holders, similar to folders, situated within a channel 230 pertaining to that channel's theme and containing one or more files and/or documents); "users" 208, 209 (unique accounts attached to individual persons within the organization 201 who are using the client application on a user computer 195 or a tablet 171 to 173); "tabs" 260 (ways of grouping channels); and "feeds" 270 (streams of notifications for updates, such as a news feed). The admin 206 may also change the logos and fix the maximum downloadable size of files via either 3G or WiFi data connections.

The admin 206 may dynamically add users via a website portal in the administrator application, creating a unique login with a username and password for each user by sending an authentication request to the email address of the user. The admin 206 has the ability to grant and change the access of any user to particular groups 220 and/or channels 230. The admin 206 may also grant any user viewing and/or publishing rights. Viewing rights only permit the user to view the channels 230 and stories 240, 241 to which the user has been granted access, as well as the content contained therein; publishing rights allow the user to upload stories 240, 241 to the channels 230 the user has access to, as well as add and/or edit content contained in any of those stories 240.

Once a user has been granted publishing access by the admin 206 to a particular channel 230, the user may create a story 240 within that channel, which enables them to compile and group different types of content, including files and other information, into a bundle of content. A particular story 240 may, for example, relate to a specific ongoing project of the organization 201, or a topic of interest. A story 240 may simply be a means of publishing a file for the purposes of viewing by other users. Further, each user has access to a unique private channel called "Mychannel", which allows them to create stories to which only that user has access.

Figure 2B:
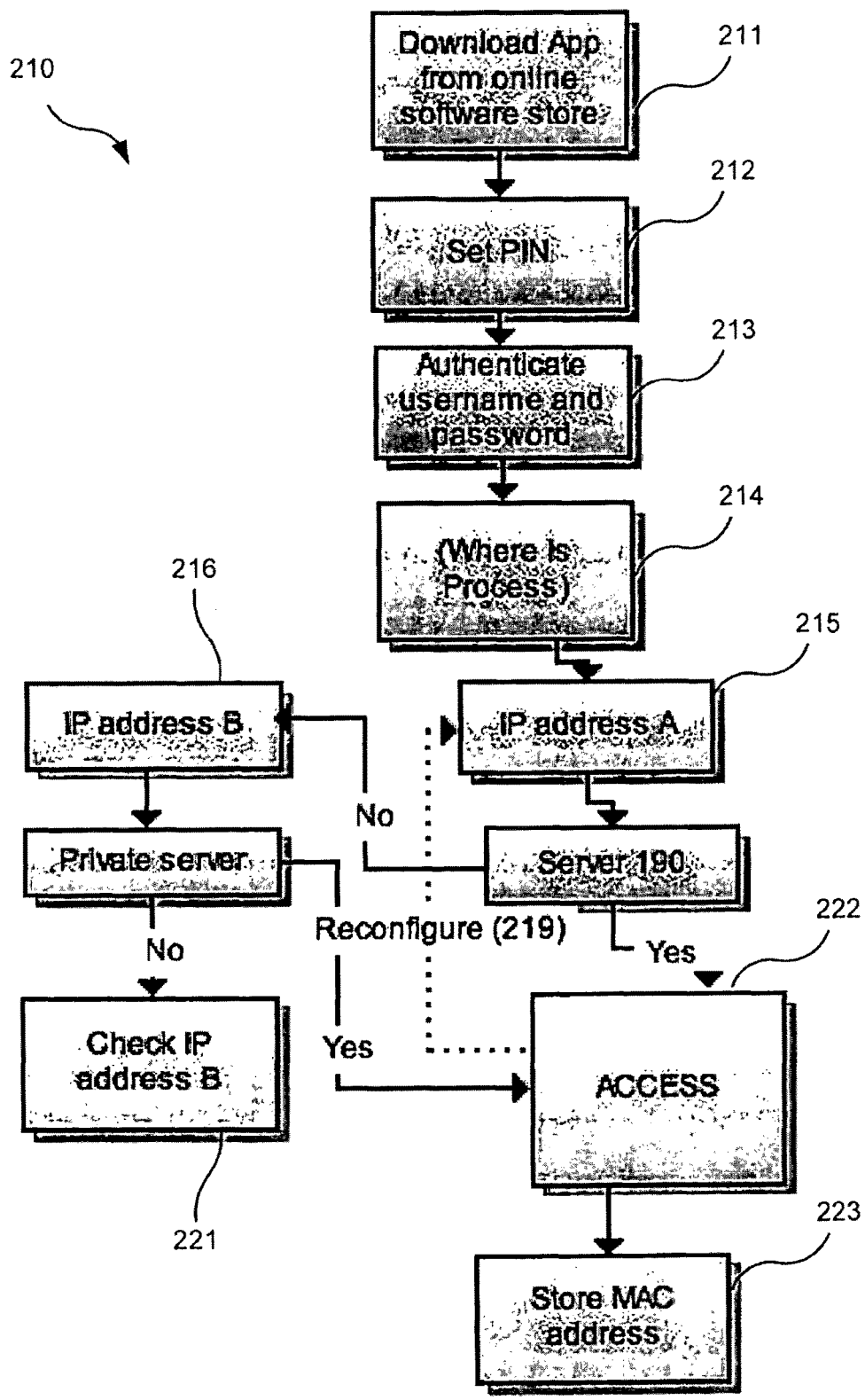
FIG. 2B is a flowchart illustrating a method by which a user may configure the client application on their associated device.

FIG. 2B is a flowchart illustrating a method 210 by which a user may configure the client application on their associated user device, either a user computer 195 or a tablet 171 to 173. At step 211, the client application (the app) is downloaded from an app store marketplace or from a website or other standard mobile app distribution technology or delivered from a website as a series of HTML statements or other web software code. Once the client application is functioning, at step 212 the user is required by the administrator 206 to set a personal identification number (PIN) as an additional security function that must be subsequently entered every time the client application is opened. At step 213, the user enters their username and password, as given by the admin 206, in order to authenticate himself or herself to the system 170.

At step 214, a "Where Is" process begins, which attempts to connect the user device to an appropriate server. The user device first attempts to connect to the IP address (A) of server 190. If access is denied, as would be the case if the organization 201 has elected to use a private server, at step 216 the client application refers to an IP address (B) of the private server as supplied to the admin 206 by the organization 201. If access is granted, IP address A is then reconfigured at step 219 to match IP address B, effectively making the private server the content management server 190 for the purposes of the methods described below. If access is still denied, IP address B requires checking correction (step 221) in order to authenticate.

Once access is granted at step 222, the server 190 at step 223 stores the UDID (Unique Device ID) or MAC address (xx:xx:xx:xx) identifying the user device, allowing the server 190 to later deliver specific content to the user device. The server 190 also allows access to be controlled to a specific set of IP addresses as configured by the admin 206, ensuring that only users accessing the server 190 from the specific IP address set are able to view content.

Figure 2C:
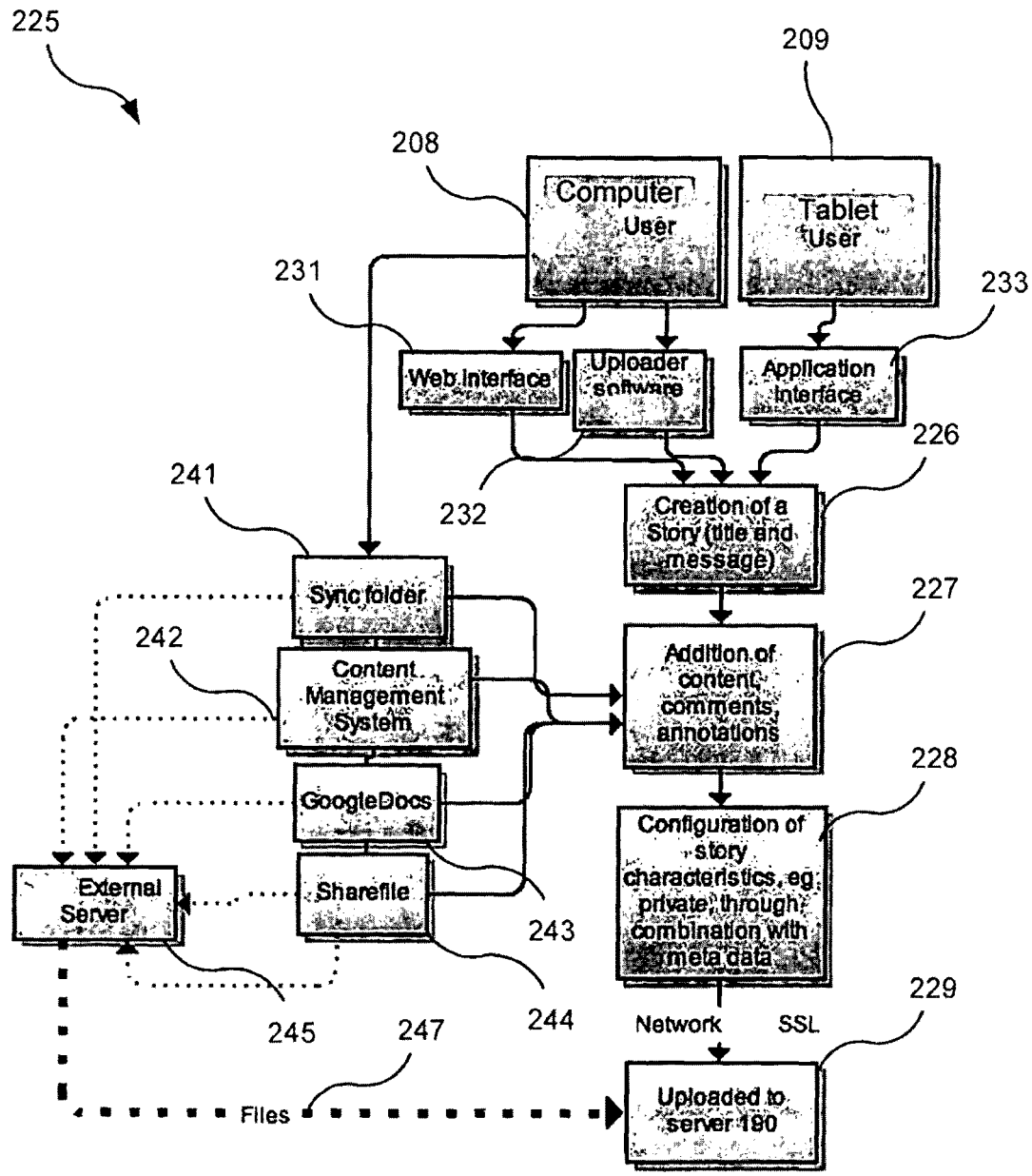
FIG. 2C is a flow chart illustrating a method by which a user creates a story, implemented as part of the client application running on a user device of FIG. 1.

FIG. 2C is a flow chart illustrating a method 225 by which a user (either a user 208 of the user computer 195 or a user 209 of one of the tablets 171 to 173) creates a story, e.g. 240. The method 225 is implemented as part of the client application running on the user device being operated by the user.

The method 225 begins at step 226, where the story creation is initiated. In order to perform step 226, the user may use a web interface 231 implemented on the user computer 195, or "uploader" software 232 forming part of the client application. If the user is operating the client application on one of the tablets 171 to 173, the user may create a story using the application programming interface 233 of the tablet or directly to the server 190 using the same or similar application programming interfaces.

At step 226, a file corresponding to the created story is opened and configured with a "title" to denote the subject of the story. The story file also comprises a message body that can be plain text, or dynamic HTML or Web content. This message body may contain the text of the story, for example an abstract that briefly describes the purpose and nature of the story content and can include links to documents or external web content. The story file may also comprise references to other files and/or documents (i.e. content) associated with the story.

At step 227, the user adds content to the story. To enable step 227, the user may use the web interface 231 implemented on the user device, or uploader software 232 contained within the client application. The user may also use a sync folder 241, located either on the user computer 195 or on the network 180, or integrate an existing Content Management System 242 (e.g. TRIM or Microsoft Sharepoint™) with the client application. The user may also import a sharefile 244 from an online file sharing service 243 such as Google Drive™ using the client application. If the user is executing the client application on one of the tablets 171 to 173, the user may add content using the application programming interface 233 of the tablet.

At step 227, where a file and/or document to be added to the story is stored on an external server 245, the client application may direct the external server 245 to upload the file content directly to server 190 rather than to the user device when the story is saved to the content database 192, as indicated by the dashed arrow 247.

A story may comprise, but is not limited to, the following types of content:
hypertext markup language (HTML);
text;
portable document format (PDF) files, including encrypted PDF files;
Word processing (e.g., doc/docx), presentation (ppt/pptx), spreadsheet (xls/xlsx) files;
Apple™ iWork™ documents;
Videos (e.g., mp4, MOV, WMV, 3GP);
Audio (e.g. MP3);
images (e.g. jpeg, gif, png);
Autocad files;
metadata describing the files, or HTML content describing the files.

Other file types may be supported and made available if deemed useful to the users of the system 170.

At the next step 228 of the method 225, the user controls one or more of numerous characteristics of the story via the creation of metadata delivered through toggle switches, such as sharing via email, annotating, expiry date, event details (which creates a calendar entry regarding what a particular story pertains to, for example, a board meeting), highlighting, notifications, and access via a Citrix session. This metadata that controls and enhances or restricts the function of the content of the story is combined with the story file and sent in the same bundle of content to the server 190.

At step 228 the story may be tagged as "private" by the user, meaning that a password will be required in order for the content of the story to be downloaded to another user device, such as another user computer similar to 195, or another tablet similar to 171.

At the final step 229, the story is uploaded from the user computer 195 or the tablet 171 to 173 to the server 190, via the network 180 using secure sockets layer (SSL) transmission.

Figure 3:
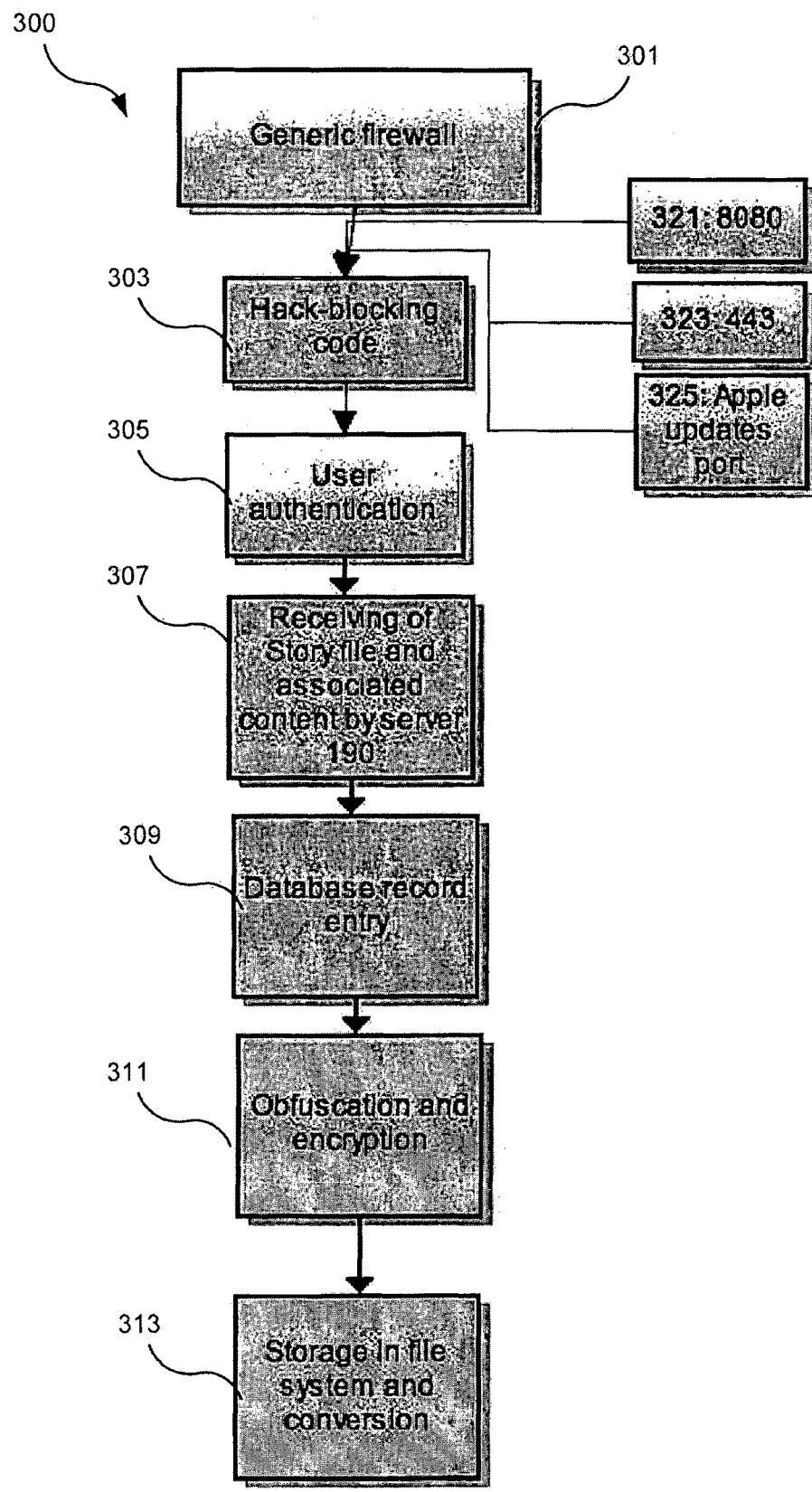
FIG. 3 is a flow chart illustrating a method of receiving and storing the story file and associated content, implemented as part of the server application running on the server of FIG. 1.

FIG. 3 is a flow chart illustrating a method 300 of receiving and storing the story file and associated content. The method 300 is implemented as part of the server application running on the server 190.

The sever 190 may be configured as a secure cloud server to provide multi-tenant access; but separating the content so as to be only viewable by particular users. This implementation enables the creation of distinct organizations that are managed as one entity, while retaining the ability to reuse resources (both network and CPU) on the hosted hardware, as well as the ability to quickly create a new implementation. The server 190 can be either hosted in a secure cloud as described above (i.e. accessible from the World Wide Web) or hosted internally to the organization 201 behind its corporate firewall and/or other secure private network access restrictions already created by the organization 201. With the creation of an internal content database 192, the organization 201 can limit access to stored content to only users within the organization 201 and approved external parties. In either implementation, the server 190 prevents file leakage with a suitable internet security technology. This is the purpose of steps 301 to 305 in the method 300.

At step 301, a generic firewall (internet intrusion protection system) implemented through perimeter software blocks all ports other than those that are necessary. These necessary ports comprise: port 8080 (321), the HTML standard port; 443, the SSL port (323); and the Apple updates port (325).

At step 303, hack-blocking code protects the server 190 from known hacking methods through the execution of secured software.

At step 305, the server 190 authenticates a user attempting to access the server 190 from user computer 195 or one of tablets 171 to 173. Step 305 accepts and checks a username and password associated with the would-be user against those configured by the admin 206, as well as passwords set up to control access to private stories.

If authentication is achieved, at step 307 the server 190 receives from the user the story and associated file content that was uploaded at step 229 of the method 225.

At step 309, the story is stored within the content database 192 of the server 190 as a database record including the story name and references to the other files and/or documents associated with the story. Each of the content files associated with a story has an associated file name. Each story database record also includes the access rights information and other recorded information for that story.

At step 311, the title of the story itself and the file names of the content files contained therein are obfuscated by the server 190 to a long file string. The title and file names are obfuscated using a predetermined process for converting a text string to a character hex string of a predetermined number of characters (e.g., forty characters) that converts the real name of the file to the format of a UDID.

The content of the uploaded story is also encrypted by the processor 105 at step 311 before being stored within the file system of the content database 192 at 313. Any suitable encryption algorithm, including. RC4 or TripleDES, may be used to encrypt the content of the story at step 311. Once the files are stored in the file system of the content database 192, the files undergo automatic resizing, and any images and video are converted to a uniform format suitable for display on user devices. The server 190 uses a predetermined conversion module to convert content to a predetermined format, for example MP4/H.264 for video, or the uniform format can be set specifically by the admin 206 for the particular organization 201.

The stories 240 are grouped within the content database into channels 230, which as described above are groups of stories that could be created around areas of interest/topics/products/customers or other areas of grouping. Receiving users are then defined based on which user group the users belong to, as configured by the admin 206, thus determining what channels the users have access to and what rights the users have to view content in, or publish new content to, that channel.

As described below in relation to the method 500, the client application on user computer 195 or tablets 171 to 173 sends requests to the server 190 for any updates or changes made to stories the associated user has access to, based on the user's access to channels as configured by the admin 206.

Figure 4:
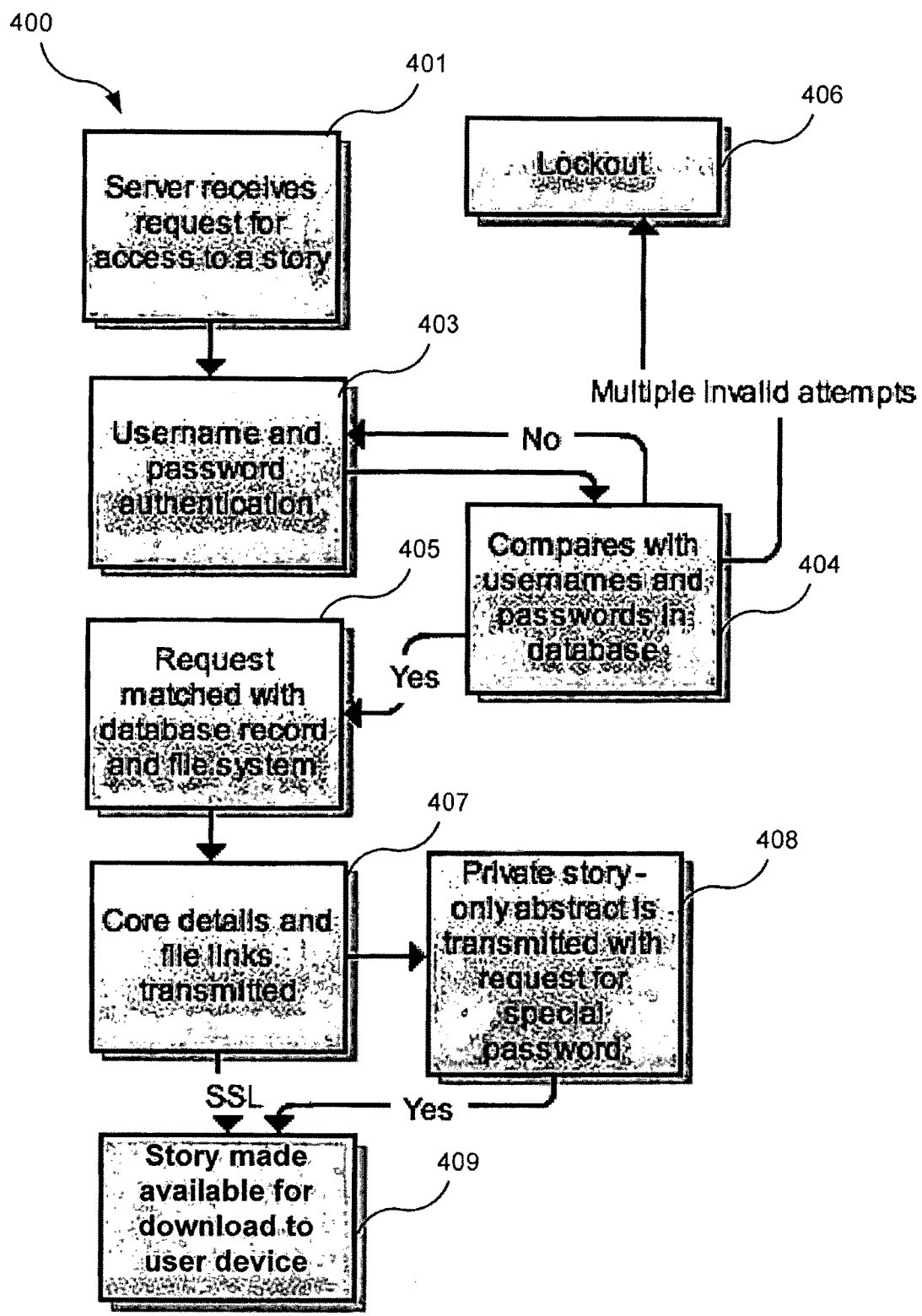
FIG. 4 is a flow chart illustrating a method of delivering content to a device, implemented as part of the server application running on the server of FIG. 1.

FIG. 4 is a flow chart illustrating a method 400 of delivering content to a user device. The method 400 will be described by way of example in which the user device to which the content is being delivered is the user computer 195. Alternatively, the user device may be one of the tablets 171, 172 or 173. The method 400 is implemented as part of the server application running on the server 190.

The method 400 begins at step 401, where the server 190 receives a request for access to a story. The request comprises a reference to the story and also the internet protocol (IP) address and UDID or MAC address of the user computer 195 that transmitted the request.

At the next step 403, the server 190 attempts to authenticate the user from which the request originated. Authentication confirmation information, e.g. a username and password, is provided with the request for access to the story. Further, access to a story may be restricted to particular IP addresses or particular UDIDs or MAC addresses.

At step 404 the server 190 compares the username and password included with the request to one or more usernames and passwords stored within the content database 192. Also at step 404, the server 190 determines whether the user associated with the username and password is allowed to access the requested story. If the IP address, UDID or MAC address, and the username and password, are authenticated by the server 190; then the method 400 proceeds to step 405. Otherwise, the method 400 returns to step 403 to re-attempt authentication.

Multiple attempts to access content with an unauthenticable username/password results in that username together with the IP address or UDID or MAC address of the user device that transmitted the request being locked out (step 406) of the system 170 for a predetermined period. In one implementation, multiple attempts' to access content with an unauthenticable username and password results in the client application executing on the user computer 195 removing all content from the user computer 195.

At step 405, the server 190 matches the request received at step 401 to story database records stored within the content database 192.

At step 407, the server 190 transmits core details of the story, such as the title of the story, via an SSL connection to the user computer 195. The server 190 also transmits links to any files associated with the requested story and stored in specific memory locations of the server 190, to the user computer 195. At step 409, the server 190 makes the content associated with the requested story, including the message body, comments, annotations and any files associated with the requested story, available for download by the client application running on the user computer 195 from which the request was transmitted.

Step 408 is executed when the story requested at step 401 is tagged within the content database 192 as private. At step 408, the server 190 transmits the message body comprising an abstract describing the subject of the story to the user computer 195. In response to receipt of the message body, the client application executing on the user computer 195 requests a special password from the user of the computer 195. The requested special password may be a password associated with the user or a special additional password. Upon receiving the requested password, the client application executing on the computer 195 uploads the requested password to the server 190 and is authenticated as at step 403. Step 409 may then be executed.

Figure 5:
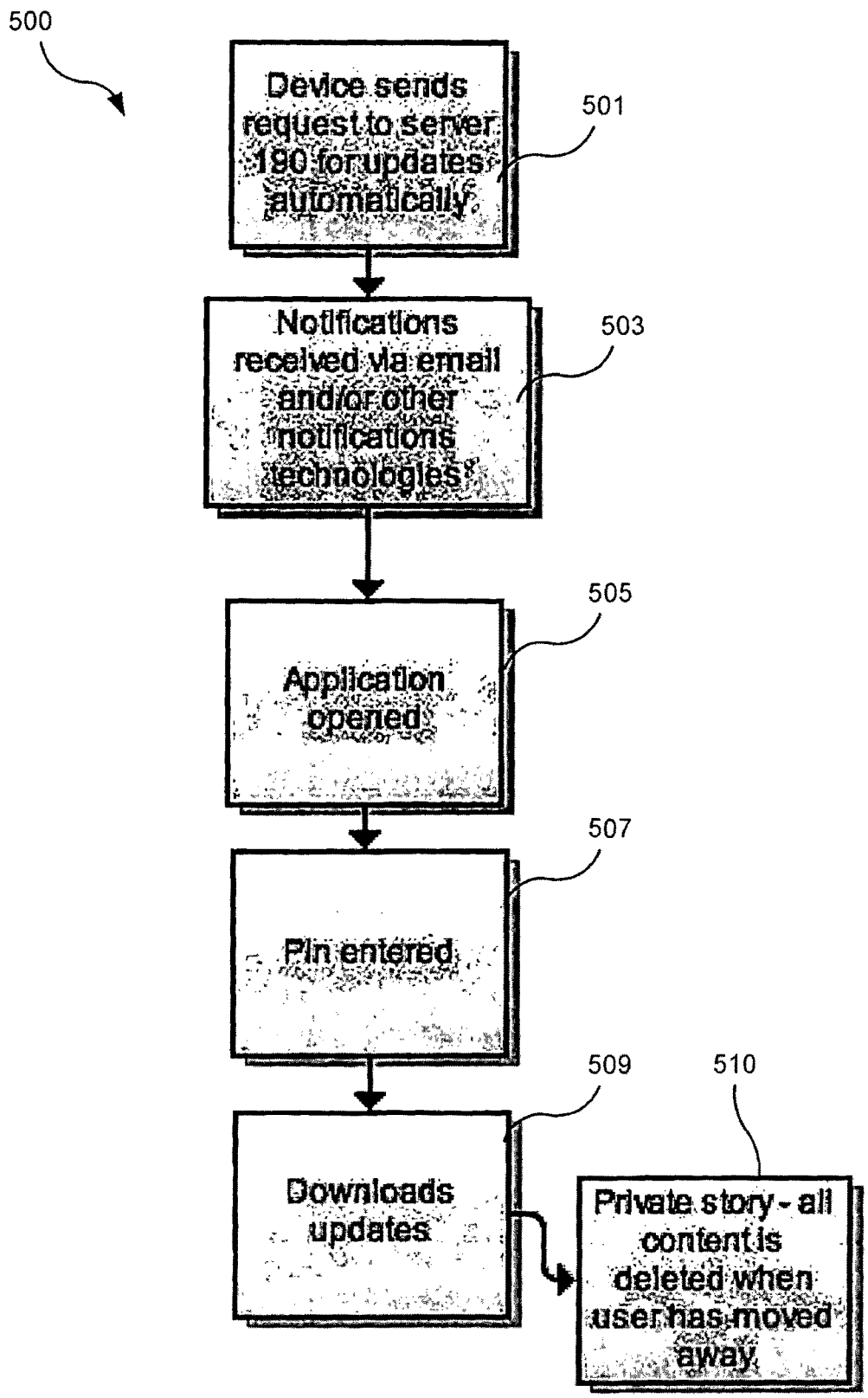
FIG. 5 is a flow chart illustrating a method of receiving an update to a story file and/or its content, implemented as part of the client application running on a user device of FIG. 1.

FIG. 5 is a flow chart illustrating a method 500 of receiving of an update to a story file and/or its content, implemented as part of the client application running on a user device, either the user computer 195 or one of the tablets 171 to 173.

The method 500 starts at step 501, where, at a predefined interval that is either coded into the client application or sent by the server 190, the client application sends a request to the server 190 for updates to any channels and/or stories that the user associated with the user device has access to.

As an alternative starting point for the method 500, when updates to channels and/or stories are made on the server 190, the server 190 sends users with viewing or publishing rights to the story or channel a notification via email or other notification technology such as Apple APNS or XMPP, as configured by the admin 206. When the client application receives such a notification, the client application at step 503 sends a request to the server 190 to obtain access to the updated channel or story.

The server 190 responds to the request by carrying out the method 400 described above, which ends by making available the requested updates to channels and/or stories for download.

Once the client application is opened by the user at step 505, and the correct device PIN entered at step 507, the client application downloads any available updates to channels and/or stories at step 509, as enabled by the server 190 in step 409 of the method 400, and adds/removes access to channels if access rights changes have occurred. An update may comprise an entire story or a change to a story.

When the client application downloads an update at step 509, the update file is stored on the user device in a secure "sandboxed" container inside the client application, meaning that the file can only be accessed from within the client application. The update file is also encrypted using either a standard method provided by a device manufacturer (e.g. encryption provided by Apple™ for iOS™) or using a well-known encryption scheme (ie Triple DES) coded into the client application. For example, on an iPad™ tablet, all files are encrypted once a password has been set up on the iPad™.

Upon downloading the content associated with the requested story from the server 190 at step 509, including the message body, comments, annotations and any files associated with the requested story, the client application running on the user device stores the downloaded content within a memory of the user device. The client application may also display the content of the story on a display of the user device. As the content is now residing on the user device, the user of the user device may add comments and/or annotations to the story content as described below, and may access the story content even when the user device is no longer connected to the server 190 via the network 180.

In one implementation, upon the user of the user device "moving away" from viewing the updated story downloaded at step 509, the client application is configured to execute step 510 which deletes all content related to the particular story from the computer 195, as occurs in the case of a private story. Step 510 forces a re-authentication and a reload of file content each time the user want to get access to a file, ensuring that no secure content remains on the user device if the user device is lost or stolen.

Further, in one implementation, if the user device is lost, the admin 206 or super-user 205 remotely wipes the content from the user device by removing the user from any groups the user may have had access to, and may also inactivate the user. This effectively removes the content in real time from the user device, including both read and unread content stories. This "remote wiping" is carried out even if the user has the client application open and is currently accessing the story to be deleted. This implementation also allows for immediate editing of content by other users, with new content replacing existing content on the user device.

The client application also incorporates technology to detect "jailbroken" iOS user devices, i.e. user devices in which a user has gained root access to the iOS operating system. This ensures that the organization 201 does not expose secure content to user devices that have been jailbroken. This technology in combination with the Apple iOS encryption delivers a secure structure for controlling highly secure content.

After the method 500 is carried out, any user who has access with publishing rights may edit or annotate the story received via the method 500, as well as attach additional content or comments. These alterations are comprised within the story file, and may occur within step 227 of method 225.

Figure 6:
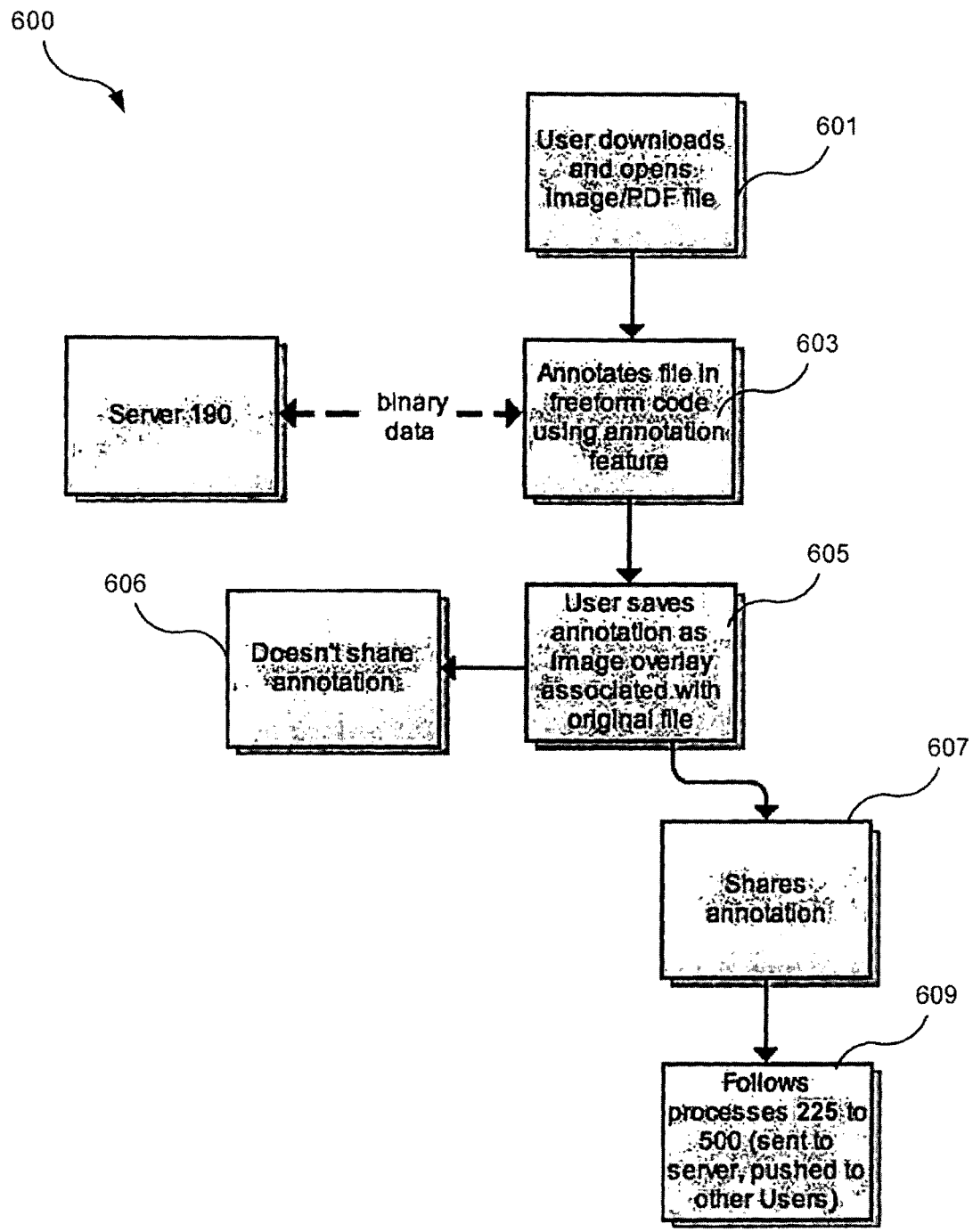
FIG. 6 is a flow diagram illustrating a method of annotating an image or PDF file through the user interface of the client application implemented on a user device of FIG. 1.

FIG. 6 is a flow diagram illustrating a method 600 of annotating an image or PDF file through the user interface of the client application implemented on the user device (e.g. the tablet 171).

The method 600 starts at step 601, where the user opens an image or PDF file, and at step 603 the user annotates the image or PDF file using an "annotate" feature in the client application. Standard annotations include pen drawing, adding text, using color highlight function, and erasing. In the same step 603, the annotation may be encoded in freeform code and sent as binary data over the network 180 to the server 190 that defines where on the image or PDF file the annotation has been performed. At step 605, the annotations are saved on the user device as image overlays associated with the original file. The annotating user then elects whether to share their annotations with other users who have access to the story containing the annotated file. If the user elects not to share the annotations, the method 600 concludes at step 606. If the user elects to share the annotations (step 607), the method 600 continues to step 609, whereby the annotation is processed by methods 225, 300, 400 and 500 described above, as a result of which the annotation is uploaded to the server 190, the server 190 notifies other users who have access to the story, and dynamically, delivers the annotations to their respective user devices.

In one implementation, only the user who made a particular annotation may delete that annotation. Annotations are archived if the annotated image or PDF file is updated or removed from view.

Any other alterations/updates to a story are similarly processed by methods 225, 300, 400 and 500 described above. This cyclical and dynamic process of story editing and delivery makes the content collaborative instead of being merely passive or view-only.

Figure 7:
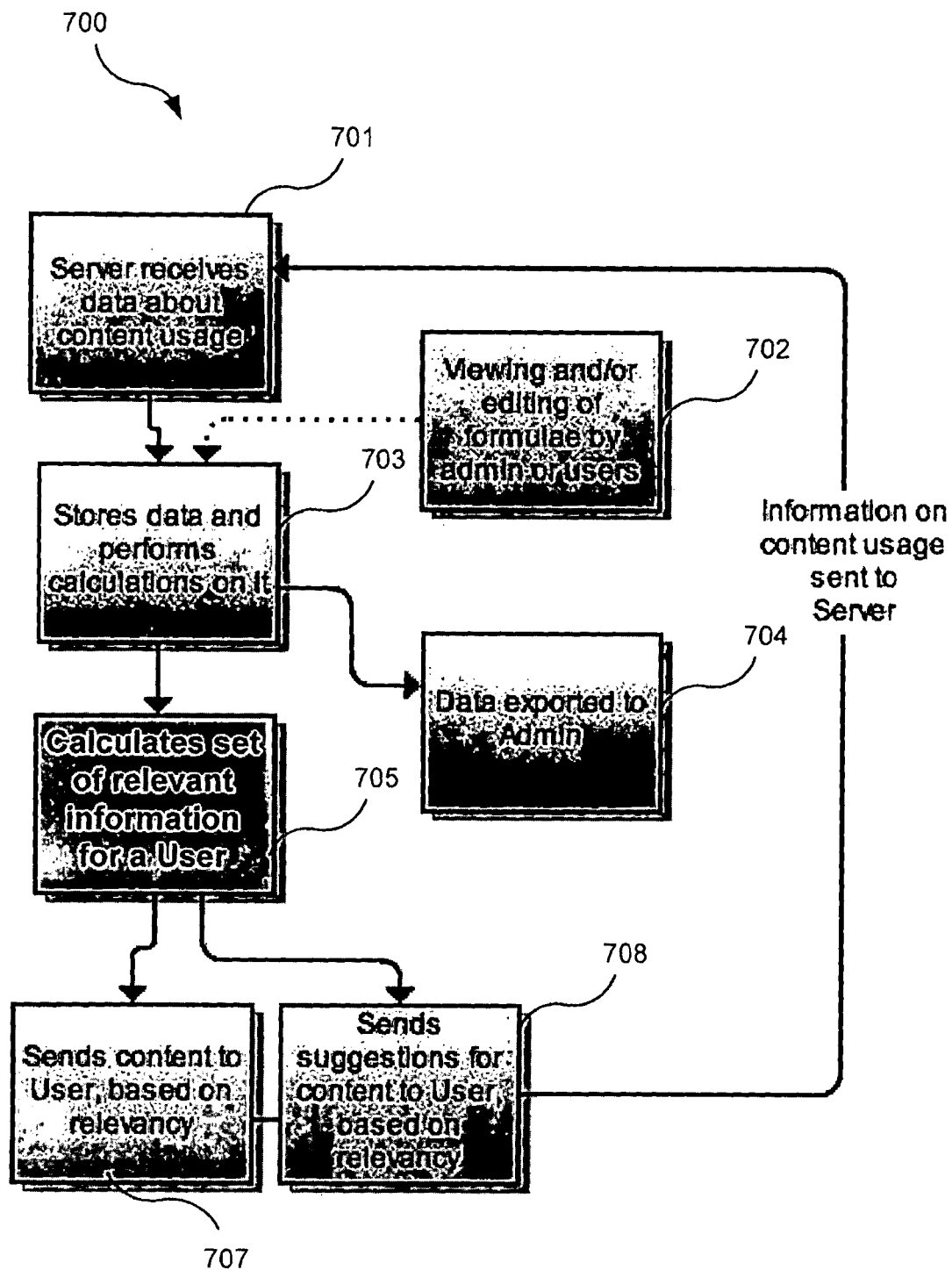
FIG. 7 is a flow chart illustrating a method of presenting content to users, implemented as part of the server application running on the server of FIG. 1.

FIG. 7 is a flow chart illustrating a method 700 of presenting content to users based on information regarding how that content has previously been used. The method 700, which is termed "content intelligence", is implemented as part of the server application running on the server 190. The presented "content" is a complete story or a file within a story.

The method 700 begins at step 701, at which the server 190 receives data about content usage when any user obtains access to the server 190. This content usage data includes, but is not limited to: which user uses which piece of content, what pages of a document are viewed, how long a document is viewed for, if the content is forwarded or shared from the system 170, what rating users gave the content, comments made on the content by users, what time of day the content was used, which location the content was used from, and a range of other potential factors related to the use of the content. Users are also structured into individuals and groups of individuals based on the aforementioned access levels (e.g. organization 201, groups 220; and channels 230, as illustrated in FIG. 2A), and the content usage data may be categorized accordingly.

At step 703, the server 190 stores the content usage data received from any user and performs calculations upon it. These calculations may be performed continually upon receipt of usage data from users, and may also be performed at specific points in time according to a schedule. The content usage data is processed through a number of formulas and other calculations to compute a "content score" that may be used to analyze the data and make decisions based on organizational value and experience in relation to the content.

In one implementation of the calculation of the content score at step 703, the usage data for a piece of content comprises the following values associated with each user who has accessed the content: number of times subscribed to by the user, number of times accessed by the user, duration of access by the user, number of times shared by the user, rating by the user, number of comments from the user. These values are multiplied by a score associated with the corresponding user, summed over all users who have accessed the content, and normalized to the range 0 to 100 to generate the content score.

At step 704, the server 190 exports the content usage data to the admin 206 either as a view on a display, or as a CSV (a generic spreadsheet format described in comma-separated values). In one implementation, the content usage data is classified into four categories:

"messages report", based upon stories;

"files report", based upon files (content) within the stories;

"shared messages report", based upon when a message has been sent; and

"shared files report", based upon when files have been transferred from the server 190.

The content scores computed at step 703 may be made available to users in order to understand how a particular piece of content is being viewed.

The server 190 then at step 705 uses the content scores in the content database 192 to calculate a set of information referring to content that has been added to the system 170 that a user, or group of users, might find relevant in or appropriate to their work or personal interest needs. The relevance of the content may be determined by analyzing a number of factors from the data obtained from any user device, including but not limited to: how others in a similar group have used the content; how long they have used the content; and if they have used the content in a similar or related location. In one implementation, the higher the content score, the more relevant is the corresponding piece of content to the user or group of users, and the set is ordered in descending order of content score. In one implementation, illustrated as step 707, the calculated set is presented to the user on an as-needed basis, whereby the relevant content is visually shown to the user when the calculation at step 705 has determined the relevant content to be shown. In another implementation, illustrated as step 708, the content is presented as an in-advance or suggestion-based model, whereby the suggested content is that which the calculation at step 705 has determined to be relevant to the needs of the user. In the suggestion-based model, the user has the option to view or interact with that content as the user finds appropriate.

Upon user interaction with the presented content, the method 700 returns to step 701, at which further information about the users' interaction with that content is sent to the server 190. That information is included in the content score calculation in step 703 for ongoing use in relation to that and other content. The method 700 continues to traverse this loop as long as the system 170 is active.

At the optional step 702, the admin 206 and/or publishing users view and edit the formula(e) used to create the content scores at step 703. This editing allows the admin 206 to influence the type of information that has been provided to the system 170. The content scores provide both the publishing user and the receiving user the ability to influence the way the content has been delivered. The system 170 provides a tool set that allows the publisher of the content or the admin 206 to review the content scores and adjust the formula(e) and update content delivered to the receiving user based on those changes. On the user side, the receiving user is able to adjust content scores based on their perception of the content that has been delivered to them.

Figure 8:
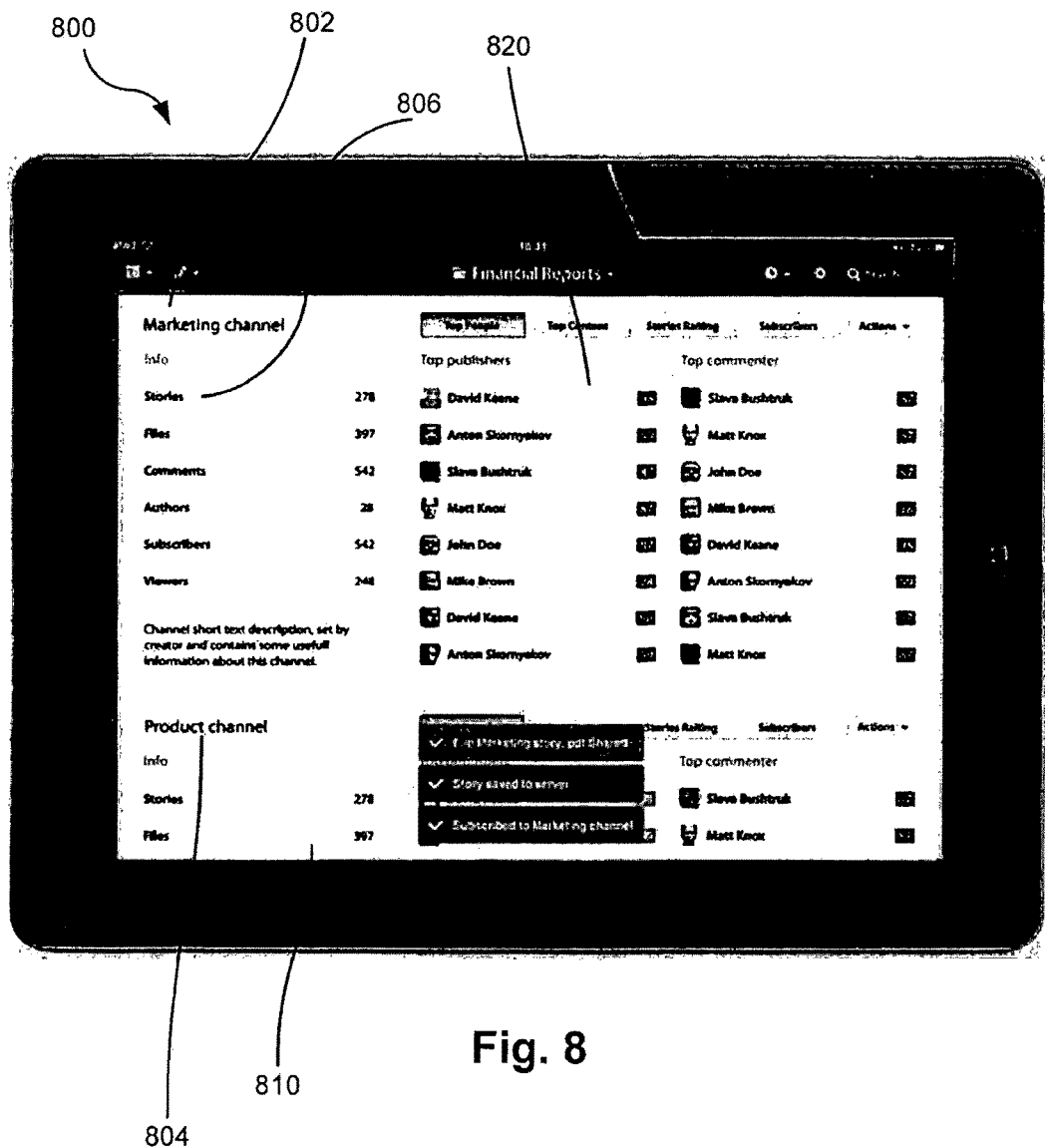
FIG. 8 contains an exemplary screenshot of the graphical user interface of the client application running on a tablet such as the tablet of FIG. 1.

FIG. 8 contains an exemplary screenshot 800 of the graphical user interface 250 of the client application running on a tablet such as the tablet 171. The screenshot 800 shows channels (a marketing channel 802 and a product channel 804) down the left side 810, each channel containing one or more stories 806, and a list of users in the center and right columns 820 of the screenshot 800.

The disclosed aspects provide a comprehensive solution for organizations to securely publish corporate information to mobile and fixed user devices to improve productivity, sales, customer satisfaction and competitive advantage.

The invention claimed is:

1. A content management system comprising:
  a. a server;
  b. content database in operative communication with the server, the content database storing therein one or more channels, each channel comprising one or more stories, each story comprising a title and one or more files, the title of each story and filenames of the files contained in the story being stored obfuscated in the content database, and the files being stored encrypted in the content database;
  c. a plurality of user devices connected to a network, each user device being associated with a user, wherein the content database is located separate to the user devices;
  and wherein the server is configured to:
    a-1. receive, upon one of the user devices obtaining access to the server, a set of content usage data for content, wherein the content is a complete one of the stories or a file within one of the stories;
    a-2. store the set of content usage data on the server;
    a-3. upon a user associated with said user device connecting to the network via said user device, calculate a relevancy score for stories or content which said associated user has access rights based on access level of said associated user and the stored content usage data; and
  wherein said user device is further configured to:
    c-1. provide access for said associated user or a further associated user to update a story downloaded from a channel to which said associated user or further associated user has publishing rights; and
    c-2. upload the updated story to the server.

2. A system according to claim 1, wherein each of said user devices is further configured to download stories to which the associated user has access rights using secure sockets layer transmission.

3. A system according to claim 2, wherein the downloaded story is stored encrypted on the user device.

4. A system according to claim 2, wherein the downloading is conditional on correct entry of a personal identification number by the user to the user device.

5. A system according to claim 1, wherein the update comprises an annotation to an image or a PDF file contained within the updated story.

6. A system according to claim 1, wherein said user device is further configured to request updates to the stories to which said associated user has access rights.

7. A system according to claim 1, wherein the server is protected by hack-blocking code.

8. A system according to claim 1, wherein said user device is further configured to delete the downloaded story upon said user moving away from accessing the downloaded story.

9. A system according to claim 1, wherein at least one said user devices is further configured to connect to the server using a Where Is process.

10. A system according to claim 1, wherein said user device is further configured to require entry of a password to view a story.

11. A system according to claim 1, wherein the content database is configured within the server.

12. A system according to claim 1, wherein the server is configured to push the one of more stories stored in the content database to the one or more user devices according to the access rights of the users associated with the user devices.

13. A system according to claim 1, wherein the users of the plurality of user devices are grouped according to access level into one or more groups.

14. A system according to claim 1, where the relevancy score of the content is determined by analysing a number of factors from the data obtained from any one of said user devices, including: how others in a group have used the content; how long the content has been used; and if the content has been used in a similar or related location.

15. A system according to claim 1, wherein when said associated user has been allowed to view one or more stories from a channel to which said associated user has access rights, a relevancy score is calculated for each of the viewed one or more stories and the viewed stories are arranged based on the relevancy scores.

16. A system according to claim 2, wherein when said associated user has been allowed to view one or more stories from a channel to which said associated user has access rights, a relevancy score is calculated for each of the viewed one or more stories and the viewed stories are arranged based on the relevancy scores.

17. A content management system implemented with physical computing resources, the system comprising:
  a user device; and
  a server in operative communication with a content database and configured to:
    receive, via a network from the user device, at least a set of content usage data representative of usage of one or more pieces of content by the user device,
    store the set of content usage data upon an associated user connecting to the server via a user device,
    calculate a relevancy score for each of the stories and content that the associated user has access to based on the stored content usage data, and
    arrange the stories or content based on the corresponding relevancy score for presentation on the user device,
  wherein the content database is located separate to the user device, and
  wherein the calculated set of information pertaining to at least one story represented by a title and at least one file, and the title and a filename of the at least one file are stored obfuscated in the content database, the at least one file being stored encrypted in the content database.

18. A method of managing content, the method comprising:
  a. uploading, by a first user device, a story comprising a title and one or more files, to a content database in operative communication with a server;
  b. requesting, by a second user device, an update to the content stored in the content database;
  c. authenticating, by the server, the second user device;
  d. calculating, by the server, a relevancy score for at least the uploaded story and one or more further stories or content based on content usage data stored on the server;
  e. arranging, by the server, the stories or content based on the corresponding relevancy score for presentation on the authenticated second user device;
  f. making available for download, by the server, the uploaded story and the one or more further stories or content; and
  g. downloading, by the authenticated second user device, the uploaded story and the one or more further stories or content,
  wherein the content database is located separate to the user devices, and
  wherein the title of the uploaded story and filenames of the files contained in the uploaded story are stored obfuscated in the content database, and the files are stored encrypted in the content database.

19. The method of claim 18, further comprising notifying, by the server, the second user device of the uploading of the story by the first user device.

20. The method according to claim 18, wherein the update is an annotation to an image or a PDF file contained within the story.

21. A content management system implemented with physical computing resources, the system comprising:
  a server in operative communication with a content database and configured to:
    receive, via a network from a user device, at least a set of content usage data representative of usage of one or more pieces of content by the user device,
    store the set of content usage data upon an associated user connecting to the server via the user device,
    calculate a relevancy score for each of the stories and content that the associated user has access to based on the stored content usage data, and
    arrange the stories or content based on the corresponding relevancy score for presentation on the user device,
  wherein the content database is located separate to the user device, and
  wherein the calculated set of information pertaining to at least one story represented by a title and at least one file, and the title and a filename of the at least one file are stored obfuscated in the content database, the at least one file being stored encrypted in the content database.

22. A method of managing content, the method comprising:
  a. receiving, from a first user device at a content database in operative communication with a server, a story comprising a title and one or more files;
  b. receiving a request, from a second user device, an update to the content stored in the content database;
  c. authenticating, by the server, the second user device;

d. calculating, by the server, a relevancy score for at least the uploaded story and one or more further stories or content based on content usage data stored on the server;
e. arranging, by the server, the stories or content based on the corresponding relevancy score for presentation on the authenticated second user device;
f. making available for download, by the server, the uploaded story and the one or more further stories or content; and
g. downloading, by the authenticated second user device, the uploaded story and the one or more further stories or content,
wherein the content database is located separate to the user devices, and
wherein the title of the uploaded story and filenames of the files contained in the uploaded story are stored obfuscated in the content database, and the files are stored encrypted in the content database.

* * * * *